Dec. 26, 1933.     H. W. RUPPLE     1,941,228
FEED MECHANISM FOR AUTOMATIC MACHINE TOOLS
Filed Nov. 6, 1931     3 Sheets-Sheet 2

INVENTOR:
HARRY W. RUPPLE
Kwis Hudson & Kent
ATTORNEYS

Dec. 26, 1933.  H. W. RUPPLE  1,941,228
FEED MECHANISM FOR AUTOMATIC MACHINE TOOLS
Filed Nov. 6, 1931  3 Sheets-Sheet 3

INVENTOR:
HARRY W. RUPPLE
ATTORNEYS

Patented Dec. 26, 1933

1,941,228

UNITED STATES PATENT OFFICE 1,941,228

FEED MECHANISM FOR AUTOMATIC MACHINE TOOLS

Harry W. Rupple, Shaker Heights, Ohio, assignor to The Cleveland Automatic Machine Company, Cleveland, Ohio, a corporation of Ohio Application November 6, 1931. Serial No. 573,463

16 Claims. (Cl. 29—37)

The present invention relates to automatic metal working machines and, more particularly, to the chuck operating and stock feeding mechanism thereof. The invention is particularly applicable to automatic machines of the multiple spindle type wherein the stock bars are automatically fed through rotatable spindles and operated upon by a plurality of tools but may be applied to other types of machine tools without materially changing the principle of operation and construction.

An object of the present invention is the provision of an improved chuck operating and stock feeding mechanism for automatic machine tools of the type referred to, which will be compact, simple, and rugged in construction and reliable and positive in operation.

Other objects and advantages of the invention will be apparent to those skilled in the art from the following description of the preferred embodiment of the invention described with reference to the accompanying drawings, in which Figure 1 is a front elevational view, with portions broken away, of the work spindle end of an automatic machine tool provided with the chuck operating and stock feeding mechanism of the present invention;

Figure 1:
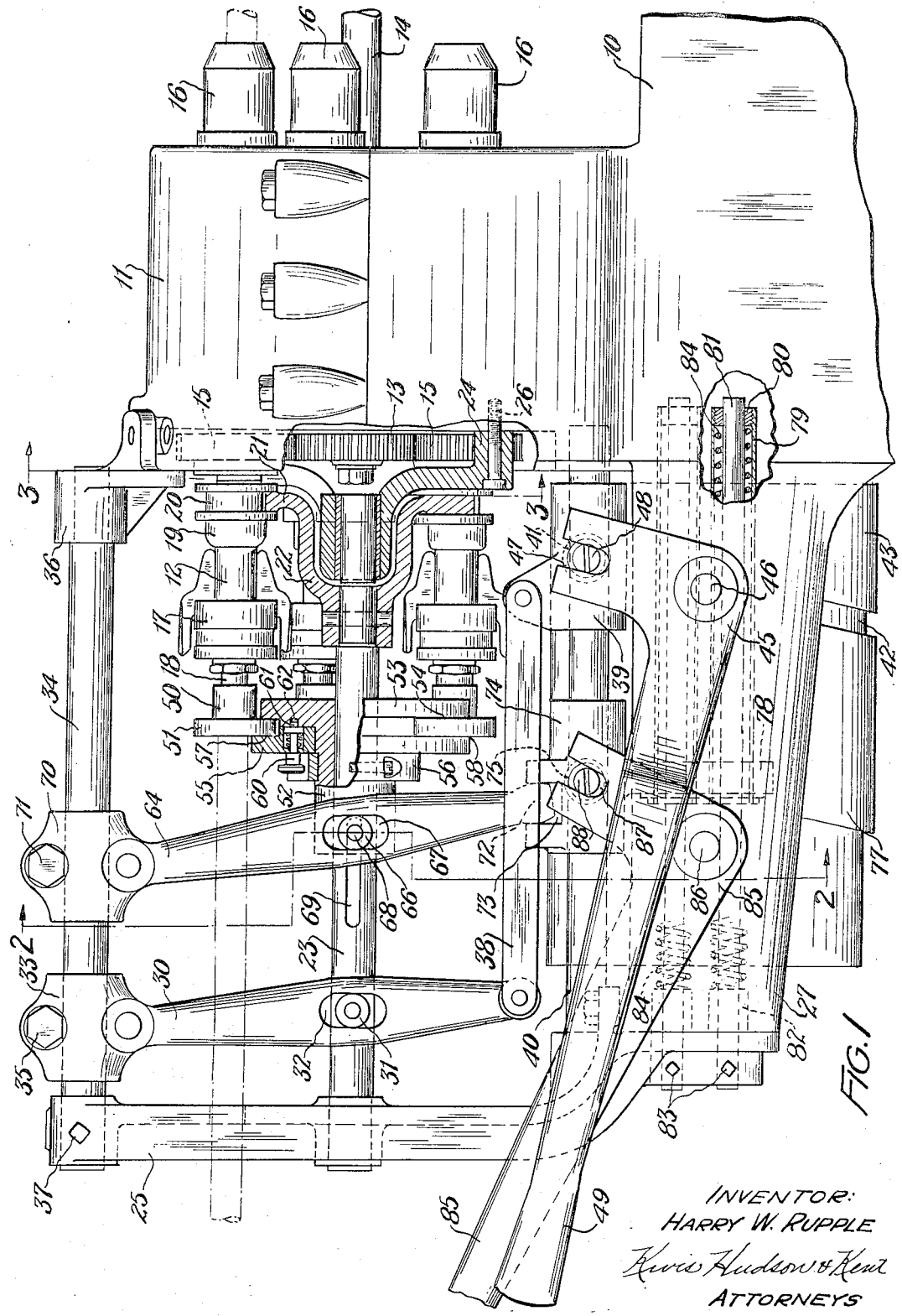
Figure 2:
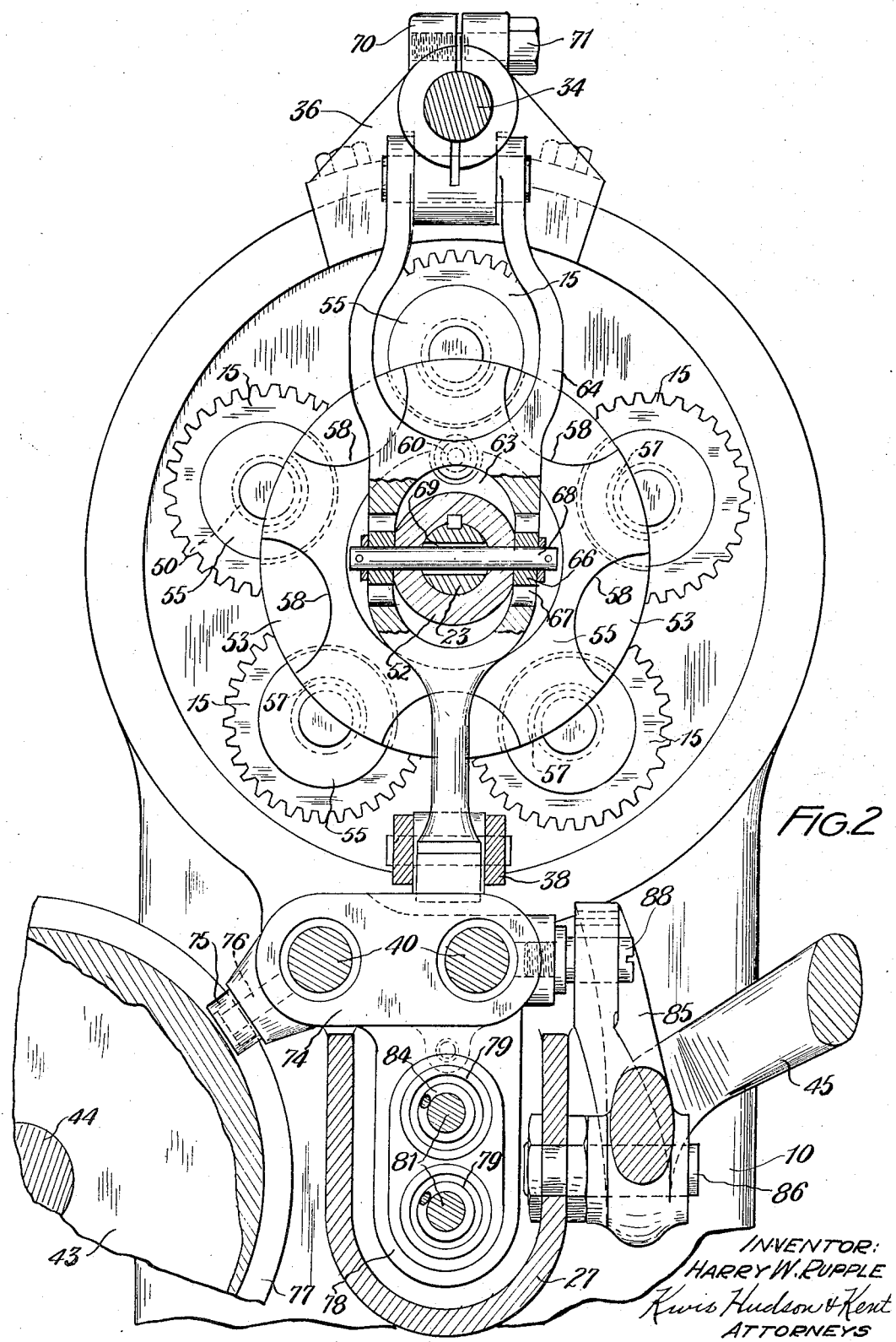
Fig. 2 is a sectional view taken on the line 2—2 of Fig. 1.
Figure 3:
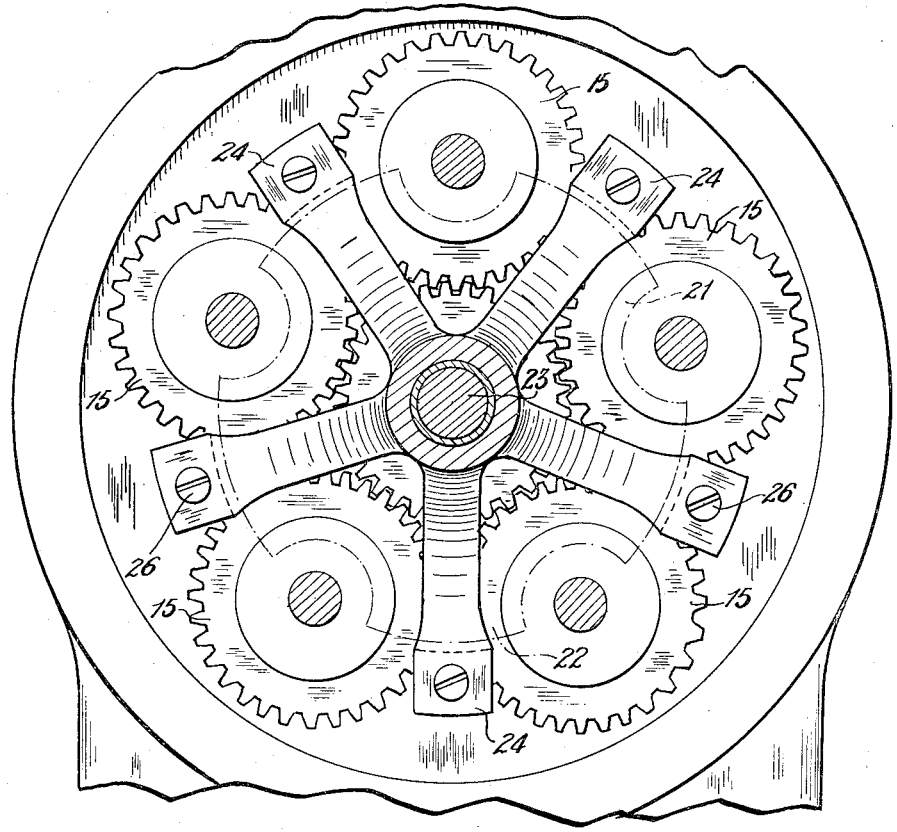
Fig. 3 is a sectional view taken on the line 3—3 of Fig. 1.
Figure 4:
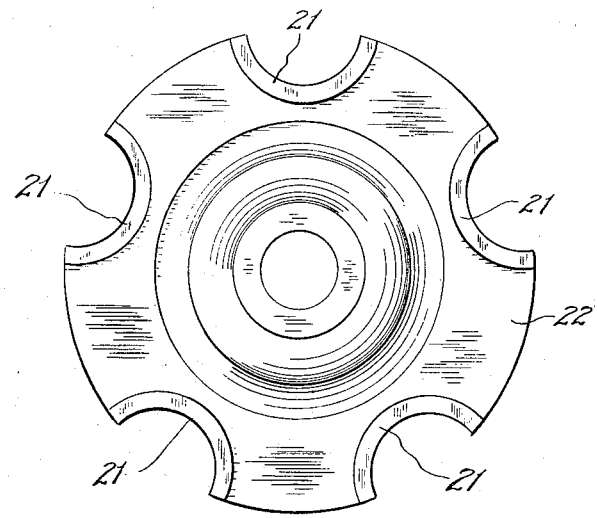
Fig. 4 is a detailed view of a part of the chuck operating mechanism.

Referring to the embodiment of the invention illustrated in the drawings, reference character 10 designates the bed of an automatic machine tool of which only the spindle end is illustrated. The machine employed in illustrating the invention is well known in the art and may be found in a plurality of different embodiments and a detailed description of the same is considered unnecessary. The bed 10 has formed on one end thereof a spindle head 11 which rotatably supports a plurality of work spindles 12, in the present instance five. The spindles 12 may be of any ordinary construction of the type adapted to have the work automatically fed through the center thereof, in predetermined time relation to the other operations of the machine. The spindles illustrated are similar to those shown in U. S. patent to J. P. Brophy, Patent No. 1,779,529, issued October 28, 1930, and reference is made to this patent for detailed construction of these spindles.

The spindles 12 are driven by a gear 13 keyed to a drive shaft 14 extending through the center of the spindle head 11, and in mesh with gears 15 fixed to the spindles. Chucks 16 are carried on the right-hand end of the spindles as viewed in Fig. 1, and are adapted to be operated by mechanisms indicated in general by reference character 17 supported at the other end of the spindles. The spindles 12 include feed tubes 18 slidably supported in the interior thereof which feed the work therethrough. The mechanisms 17 are operated by cam or chuck thimbles 19 slidably supported on the exterior of the spindles 12 and provided with a groove 20 in which finished parts 21 of an annular member 22 engage. The member 22 is fixed to a shaft 23 slidably supported at one end in a spider shaped member 24, and at the other end in a bracket 25. The spider shaped member 24 is attached to the spindle head 11 as by the screws 26, and the bracket 25 is supported on a horn 27 projecting from the bed 10 and formed integral therewith or attached thereto in any suitable manner.

The shaft 23 projects through an opening formed in a lever 30 and is operatively connected thereto by the engagement of rollers 31 carried by said shaft, in elongated slots 32 formed in the lever 30 between the ends thereof and communicating with the opening through which the shaft extends. The lever 30 is pivotally connected at one end to a split collar 33 adjustably secured to a shaft 34 by means of a bolt 35. The shaft 4 is supported at one end in a bracket 36 fixed to the spindle head 11 and at the other end, in the bracket 25 and held therein by a set screw 37. Link members 38 are pivotally connected to the lower end of lever 30 and to a member 39 slidably supported on a pair of rods 40. The rods 40 are fixed in the bed 10 and to bracket 25 and extend along the top of the horn 27. A cam roller 41 carried on a pin fixed to the member 39 operatively engages in a cam track 42 on a cam drum 43 carried on the main cam shaft 44 of the machine.

The construction is such that the chuck is operated to engage and release the work through the mechanism just described by the rotation of the cam drum 43, in timed relation to the other operations of the machine, all of which are controlled from the main cam shaft. For manual operation of the chucks 16 a bell crank lever 45 is pivotally mounted on a pin 46 secured to the horn 27. A slot 47 formed in one arm of the bell crank lever 45 engages a pin 48 fixed to the member 39. A hand grasp 49 is formed on the other arm of the bell crank lever 45.

Collar members 50 provided with annular flanges 51 are fixed on the ends of the feed tubes 18 projecting to the left, as viewed in Fig. 1. A sleeve member 52 slidably keyed on the shaft 23 has formed on one end thereof an annular flange 53, portions of which are cut away as at 54 to receive the flange 51. A disk member 55 rotatably mounted on the sleeve 52 between the flange 53 and a split collar 56, has cut away portions 57 adapted to engage the other side of the flanges 51. The disk member 55 is also provided with a plurality of openings 58 normally spaced between the spindles 12 and adapted to permit the withdrawal of the feed tubes 18 together with the collar members 50 when the member 55 is rotated so that the openings 58 are in alignment with the spindles. The member 55 carries a spring plunger 60, the end 61 of which projects into a hole 62 in the flange 53 and locks the disk 55 to the flange 53 in the position illustrated in the drawings.

The sleeve 52 projects through an opening 63 formed in a lever 64 and is operatively connected thereto by the engagement of rollers 66 carried by said sleeve in elongated slots 67 formed in the lever 64 between the ends thereof and communicating with the opening 63. The rollers 66 are carried on a pin 68 which extends through an elongated slot 69 in the shaft 23 and permit longitudinal movement of the shaft 23 and the sleeve 52 relative to each other.

The lever 64 is pivotally connected at one end to a split collar 70 adjustably secured to the shaft 30 by a bolt 71. A finished head 72 formed on the lower end of the lever 64 engages in a slot 73 in a member 74. The member 74 is slidably mounted on the rods 40 and carries a cam roller 75 rotatably mounted on a pin 76 affixed thereto. The cam roller 75 engages a cam plate 77 fixed to the cam drum 43 and is moved thereby towards the left, as viewed in Fig. 1. The member 74 has a projection 78 formed integral therewith and extending downward therefrom, which carries a plurality of tubes 79 secured thereto in any suitable manner. The tubes 79 are closed at the right hand end as viewed in Fig. 1, by plugs 80 threaded therein. Rods 81 are supported at one end in the plugs 80 and have the other ends thereof secured as by the set screws 83 in bosses 82 formed on the bracket 25. Springs 84 mounted on the rods 81 are compressed between the bosses 82 and the plugs 80 and continuously urge the member 74 to the right, as viewed in Fig. 1. The construction is such that the feed shells 18 are moved to the right to feed the work through the spindles by the action of the springs 84 through the mechanism just described, in predetermined timed relation to the other operations of the machine since the movement of the member 74 is controlled by the cam plate 77 on the cam drum 43. The springs 84 are compressed and the feed shell moved in the reverse direction by the action of the cam plate 77. For manual operation of the feed shells 18 a bell crank lever 85 is pivotally mounted on a pin 86 secured to the horn 27. A slot 87 formed in one arm of the bell crank lever 85 engages a pin 88 fixed to the member 74. A hand grasp is formed on the outer arm of the bell crank lever 85.

The operation of the machine is as follows:

Assuming that the parts of the machine are in the relative positions shown in Fig. 1, the chucks 16 are released and the work bars have just been fed forward through the spindles 12 by the feed shells 18. As the operation of the machine continues, rotation of the cam drum 43 causes the cam track 42 to move the member 39, and, through the links 38, the lever 30, the shaft 23, and the member 22, the cam or chuck thimble 19 to close the chucks 16. After the chucks have closed to securely engage the work the machining operations commence and the feed tubes 18 are withdrawn to their left or feeding position by the action of the cam plate 77. After the machining operations are completed, the tools are withdrawn from the work and the cam member 19 moved to operate the mechanism 17 to release the chuck jaws. While the chuck jaws are in this position, the feed shells 18 are moved to feed the work through the spindles, by the springs 84 through the members 74, etc.

The embodiment of the invention illustrated and described is merely the preferred form and I do not wish to be limited to the particular construction as shown, which may be varied within the scope of this invention and particularly point out and claimed as my invention:

I claim,

1. A feed device for an automatic machine tool comprising, a shaft slidably supported in a frame equally spaced from a plurality of spindles, a member fixed to said shaft and adapted to operate a chuck, a sleeve slidably supported on said shaft, a projection on said sleeve adapted to engage one side of a feed member, a member rotatably mounted on said sleeve adapted to engage the other side of said feed member, means for adjusting said last mentioned member relative to said projection, and an opening in said member adapted to be aligned with said feed member.

2. A feed device for an automatic machine tool comprising, a shaft slidably supported in a frame equally spaced from a plurality of spindles, a member fixed to said shaft and adapted to engage a plurality of chuck operating members carried by said spindles, a sleeve slidably supported on said shaft, means on said sleeve adapted to engage a plurality of feed members, and means for operating said shaft and sleeve in predetermined timed relation.

3. A feed device for an automatic machine tool comprising, a shaft slidably supported in a frame equally spaced from a plurality of spindles, an annular member carried by said shaft and adapted to engage chuck operating members carried by the spindles, a sleeve slidably supported on said shaft, a flange on said sleeve adapted to engage one side of feed members carried by the spindles, a member rotatably mounted on said sleeve and adapted to engage the other side of said feed members, and means for operating said shaft and sleeve in predetermined timed relation.

4. In a machine of the character described the combination of a frame, a spindle rotatably supported by said frame, a member slidably supported in said spindle adapted to feed work through the center thereof, a chuck carried by said spindle, a member slidably carried by said spindle and adapted to operate said chuck, a shaft slidably supported in said frame and operatively connected to one of said members, a sleeve member slidably supported on said shaft and operatively connected to the other of said members, said sleeve member comprising a tubular member provided with a flange adapted to engage one side of said member, and a rotatable member carried by said tubular member adapted to engage the other side of said member, and means for moving said shaft and said sleeve in predetermined timed relation.

5. In a machine of the character described the combination of a frame, a spindle rotatably supported by said frame, a chuck carried by said spindle, a feed member carried by said spindle, chuck operating means carried by said spindle, a shaft slidably supported by said frame and operatively connected to said chuck operating means, a sleeve slidably supported on said shaft and operatively connected to said feed member, and means for operating said shaft and sleeve in predetermined timed relation.

6. In a machine of the character described the combination of a frame, a spindle rotatably supported by said frame, a chuck carried by said spindle, a feed member carried by said spindle, chuck operating means carried by said spindle, a shaft slidably supported by said frame and operatively connected to said chuck operating means, a sleeve slidably supported on said shaft and operatively connected to said feed member, a lever pivotally supported by said frame and operatively connected to said shaft, a second lever pivotally supported by said frame and operatively connected to said sleeve, and means for moving said levers in predetermined timed relation.

7. In a machine of the character described the combination of a frame, a spindle rotatably supported by said frame, a chuck carried by said spindle, a feed member carried by said spindle, chuck operating means carried by said spindle, a shaft slidably supported by said frame and operatively connected to said chuck operating means, a sleeve slidably supported on said shaft and operatively connected to said feed member, a lever pivotally supported by said frame and operatively connected to said shaft, a second lever pivotally supported by said frame and operatively connected to said sleeve, a plurality of members slidably supported by said frame and operatively connected to said levers, and means for moving said members in predetermined timed relation.

8. In a machine of the character described the combination of a frame, a spindle rotatably supported by said frame, a chuck carried by said spindle, a feed member carried by said spindle, chuck operating means carried by said spindle, a shaft slidably supported by said frame and operatively connected to said chuck operating means, a sleeve slidably supported on said shaft and operatively connected to said feed member, a lever pivotally supported by said frame and operatively connected to said shaft, a second lever pivotally supported by said frame and operatively connected to said sleeve, a plurality of members slidably supported by said frame and operatively connected to said levers, automatic means for moving said members, and manual means for moving said members.

9. In a machine of the character described the combination of a frame, a spindle rotatably supported by said frame, a chuck carried by said spindle, a feed member carried by said spindle, chuck operating means carried by said spindle, a shaft slidably supported by said frame and operatively connected to said chuck operating means, a sleeve slidably supported on said shaft and operatively engaging one side of said feed member, a member rotatably mounted on said sleeve and adapted to operatively engage the other side of said feed member, means to adjust said member in different angular positions, and openings in said member adapted to be aligned with said feed member.

10. In a machine of the character described the combination of a frame, a spindle supported in said frame, a chuck carried by said spindle, a feed member carried by said spindle, chuck operating means carried by said spindle, a shaft slidably supported in said frame and operatively connected to said chuck operating means, a sleeve slidably supported on said shaft and operatively connected to said feed member, cam means for moving said shaft and sleeve, and resilient means for moving said sleeve in one direction.

11. In a machine of the character described the combination of a frame, a spindle rotatably carried by said frame, a feed shell slidably carried by said spindle adapted to feed work through the center thereof, a chuck carried by said spindle, a cam member slidably carried by said spindle and adapted to operate said chuck, a shaft slidably supported in said frame, a member carried by said shaft operatively connected with said cam means, a sleeve member slidably supported on said shaft and operatively connected to said feed shell, a lever pivoted at one end of said frame and operatively connected between its ends to said shaft, a member slidably supported on said frame and operatively connected to said lever, resilient means for moving said member in one direction, cam means for moving said member in the reverse direction, a second lever pivoted at one end to said frame and operatively connected between its ends to said sleeve, a second member slidably mounted on said frame and operatively connected to said lever, and cam means adapted to move said second member in predetermined timed relation to the movements of the first mentioned member.

12. In a machine of the character described the combination of a frame, a work spindle rotatably carried by said frame, a feed shell slidably carried by said spindle and adapted to feed work through the center thereof, a chuck carried by said spindle, a cam member slidably carried by said spindle adapted to operate said chuck, a shaft slidably supported in said frame, an annular member carried by said shaft and operatively connected to said cam member, a sleeve slidably carried on said shaft, flange means on said sleeve operatively engaging said feed shell, a lever pivoted at one end to said frame and operatively connected between its ends to said sleeve, a second lever pivoted at one end to said frame and operatively connected between its ends to said shaft, a member slidably mounted on said frame and operatively connected to said first mentioned lever, a second member slidably mounted on said frame and operatively connected to said second lever, resilient means continuously urging said first mentioned member in one direction, and cam means for moving both of said members in predetermined timed relation.

13. In a machine of the character described the combination of a frame, a plurality of work spindles rotatably carried by said frame, feed shells slidably carried by said spindles and adapted to feed work through the center thereof, chucks carried by said spindles, cam members slidably carried by said spindles adapted to operate said chucks, a shaft slidably supported in said frame, an annular member carried by said shaft and operatively connected to said cam members, a sleeve slidably carried on said shaft, flange means on said sleeve operatively engaging said feed shells, a lever pivoted at one end to said frame and operatively connected between its ends to said sleeve, a second lever pivoted at one end to said frame and operatively connected between its ends to said shaft, a member slidably mounted on said frame and operatively connected to said first mentioned lever, a second member slidably mounted on said frame and operatively connected to said second lever, resilient means continuously urging said first mentioned member in one direction, and cam means for moving both of said members in predetermined timed relation.

14. In a machine of the character described the combination of a frame, a spindle rotatably supported by said frame, a chuck carried by said spindle, a member carried by said spindle adapted to feed work through the center thereof, a member carried by said spindle adapted to operate said chuck, a shaft slidably connected to one of said members, a sleeve slidably supported on said shaft and operatively connected to the other of said members, a lever pivotally supported by said frame, and operatively connected to said shaft, a second lever pivotally supported by said frame and operatively connected to said sleeve, and means for moving said levers in predetermined timed relation.

15. In a machine of the character described the combination of a frame, spindles rotatably supported by said frame, chucks carried by said spindles, members carried by said spindles adapted to feed work through the center thereof, members slidably carried by said spindles and adapted to operate said chucks, a shaft slidably supported by said frame and operatively connected to one of said members, a sleeve slidably supported on said shaft and operatively connected to another of said members, a disc member rotatably mounted on said sleeve and adapted to engage one of said members, and openings in said disc member adapted to be aligned with one of said members.

16. In a machine of the character described the combination of a frame, a spindle rotatably supported in said frame, a chuck carried by said spindle, a member slidably supported in said spindle adapted to feed work through the center thereof, a member slidably supported by said spindle and adapted to operate said chuck, a shaft slidably supported in said frame and operatively connected to one of said members, a sleeve slidably supported on said shaft and operatively connected to the other of said members, and resilient means for moving one of said last mentioned members.

HARRY W. RUPPLE.